United States Patent
Lin et al.

(10) Patent No.: US 12,468,571 B2
(45) Date of Patent: Nov. 11, 2025

(54) DYNAMIC HETEROGENEOUS TASK PROCESSING

(71) Applicant: Google LLC, Mountain View, CA (US)

(72) Inventors: Jamie Menjay Lin, San Diego, CA (US); Chuo-Ling Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 560 days.

(21) Appl. No.: 17/935,709

(22) Filed: Sep. 27, 2022

(65) Prior Publication Data

US 2024/0111572 A1     Apr. 4, 2024

(51) Int. Cl.
   *G06F 9/46*     (2006.01)
   *G06F 9/48*     (2006.01)

(52) U.S. Cl.
   CPC .......... *G06F 9/4881* (2013.01); *G06F 9/463* (2013.01)

(58) Field of Classification Search
   CPC ............................... G06F 9/4881; G06F 9/463
   See application file for complete search history.

(56) References Cited

U.S. PATENT DOCUMENTS

| 2017/0083368 A1 | 3/2017 | Bishop et al. |
| 2021/0058582 A1 | 2/2021 | Aubie et al. |

FOREIGN PATENT DOCUMENTS

| CN | 113590321 A | 11/2021 |
| WO | 2020108303 A1 | 11/2019 |
| WO | 2022000157 A1 | 1/2022 |

OTHER PUBLICATIONS

Wu, et al., "Parallel Detection for Efficient Video Analytics at the Edge", arXiv:2107.12563v1, Jul. 27, 2021, 11 pages.

*Primary Examiner* — Gregory A Kessler
(74) *Attorney, Agent, or Firm* — Brake Hughes Bellermann LLP

(57) ABSTRACT

A method including processing a stream of data in a sequence of tasks. The processing including receiving a first block of data of the stream of data, determining features associated with the first block of data, selecting, based on the features, one of a first a task to process the first block of data or a second task to process the first block of data and if the second task is selected, shift an output of the second task in time to align the output of the second task with a predicted output of the first task processing a second block of data of the stream of data.

20 Claims, 6 Drawing Sheets

DYNAMIC HETEROGENEOUS TASK PROCESSING

FIELD

Embodiments relate to real-time processing of a sequence of tasks. For example, embodiments can relate to processing frames of media content where each frame is processed (e.g., compressed) using a machine learned task.

BACKGROUND

Processing a sequence of tasks is typically limited by the longest computation against a real-time constraint. For example, for the I-P-B-frame-like processing scheme (e.g., in video compression), the processing system design is limited by the longest computations among those in frame-rate processing. In other words, in order to process within a predefined frame rate, system design is limited to using tasks that can be completed within the time constraint, i.e., a task with the longest computation must provide its output within the frame rate. Distributed or heterogeneous task computation can be used when a device has limited processing capabilities. However, distributed or heterogeneous task computation can suffer from increased latency. This latency can be due in part to data transportation and buffering of non-colocation and/or cross-core connectivity.

SUMMARY

Example implementations include an architecture that supports distributed and/or heterogeneous computation. The architecture can process data using a sequence of tasks. A task of the sequence of tasks can be replaced in the sequence should a portion of the data preferably be processed by another task. The task substitution can increase output quality while ensuring that the sequence of tasks are processed within a real-time constraint (e.g., a frame rate). The task substitution may cause the processing of the sequence of tasks to include a latency such that processing the sequence of tasks may not be guaranteed to meet the real time constraint, but with higher quality. Implementations may use a spatiotemporal feature transitivity (STFT) function to shift the output from the substitute task in time so that the higher quality output can be used in a (real-time) sequence of outputs that are generated within the time constraint.

In a general aspect, a device, a system, a non-transitory computer-readable medium (having stored thereon computer executable program code which can be executed on a computer system), and/or a method can perform a process with a method including processing a stream of data in a sequence of tasks. The processing including receiving a first block of data of the stream of data, determining features associated with the first block of data, selecting, based on the features, one of a first a task to process the first block of data or a second task to process the first block of data and if the second task is selected, shift an output of the second task in time to align the output of the second task with a predicted output of the first task processing a second block of data of the stream of data.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
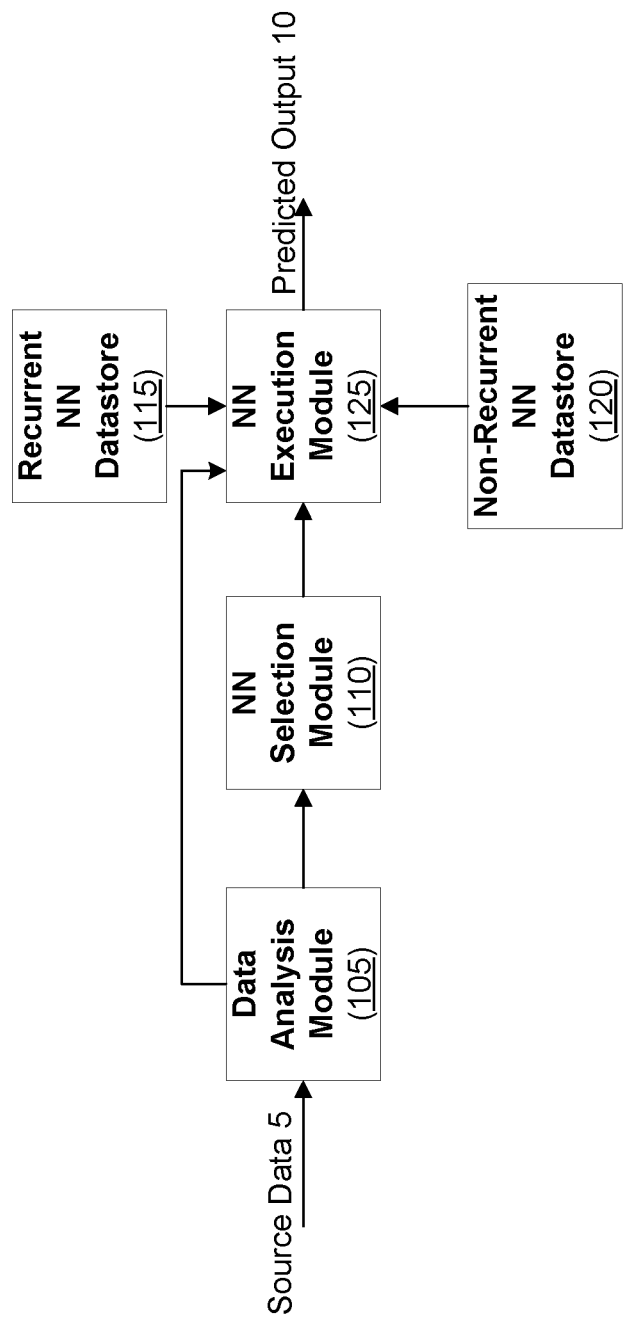
FIG. 1 illustrates a block diagram of a data flow according to an example implementation.

The Figures are intended to illustrate the general characteristics of methods, and/or structures utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

The processing of a sequence of tasks can be limited by a real-time constraint. For example, a task, a sequence of tasks and/or a subset of the sequence of tasks may need to be completed within a time constraint. There may be different ways of accomplishing a task, the different ways having tradeoffs between complexity and latency. For example, operations with high complexity may take longer but provide better (more accurate, more complete) output, where operations with low complexity may provide an output faster, but with less ability to process the data. In other words, the completion time of a task can be based on processing complexity. The processing complexity can be based on the data being processed, e.g., complex data having higher processing complexity. Therefore, a processing system may face a decision of whether to either not process (or not completely process) data or to fail to meet the time constraint for complex data. A distributed and/or heterogeneous computation architecture can be used to process more complex data. A problem with distributed and/or heterogeneous computation architecture is that processing that is distributed (e.g., separated into small processing elements the output of which is reassembled after processing) or processing that is offloaded to a remote processor can add time (e.g., latency) in the processing pipeline. This additional time can lead to not meeting the time constraint.

Example implementations can solve these problems by implementing a distributed and/or heterogeneous computation architecture that can select between a task implementation with a processing time that meets the time constraint and a task implementation with a processing time that does not meet the time constraint and has a time shifting function, e.g., a spatiotemporal feature transitivity (STFT) function, that can adjust an output of this longer-running task spatiotemporally to be used within the time constraint. An STFT can be a time shifting function takes a predicted output for a past frame and adjusts it to make a prediction for a current frame. For example, an STFT can be a function configured to map (e.g., predict a map) an output of a first task to an output of a second task where the input to the first task and the second task are selected from a sequence of data and the data selected for input to the first task is sequentially earlier in time than the data selected for the second task.

An example system overcomes existing limitations for real-time streaming applications. For example, the system can include modules and/or components that can support multi-level (e.g., greater than two levels) concurrent and/or parallel computation. An example real-time system can be realizable with distributed and/or heterogeneous computation elements. An example method can enable processing adaptivity with real-time throughput guarantees. The guaranteed real-time throughput can adapt to global shifts in features and environment. An advantage of the example implementations can be that the system and/or method can accommodate latencies larger than the period of real-time constraints, with real-time throughput guarantees. In addition, example implementations can support both spatial and temporal features associated with input data. In addition, example implementations can support training, learning and/or an inference should the task be implemented using a neural network.

FIG. 1 illustrates a block diagram of a data flow according to an example implementation. As shown in FIG. 1, the data flow includes a data analysis module 105 block, a neural network selection module 110 block, a recurrent neural network datastore 115 block, a non-recurrent neural network datastore 120 block, and a neural network execution module 125 block.

The data analysis module 105 can be configured to analyze source data 5. The source data 5 can be a frame of a video. Therefore, the data analysis module 105 can be configured to analyze a frame of a video. Analyzing a frame of video can include determining an amount of processing necessary to accomplish a task (e.g., compress) associated with the frame of the video. The amount of processing can be compared to a maximum amount of time to complete the task. For example, compressing a frame that is substantially the same as a previous frame can include a minimum amount of processing and therefore be completed in a first (e.g., minimal) amount of time. By contrast, compressing a frame that is significantly different as a previous frame can include a significant amount of processing (e.g., more than compressing a frame that is substantially the same as a previous frame) and therefore be completed in a second (e.g., more than the first) amount of time. In either situation, processing the frame should be completed in less than a threshold (e.g., based on a frame rate) amount of time.

The source data 5 can be real-time audio. Therefore, the data analysis module 105 can be configured to analyze a block (e.g., a period of time) of audio. Analyzing a block of audio can include determining an amount of processing necessary to accomplish a task (e.g., compress) associated with the block of audio. The amount of processing can be compared to a maximum amount of time to complete the task. For example, processing a block of audio that is substantially absent of sound in a voice command system can include a minimum amount of processing and therefore be completed in a first (e.g., minimal) amount of time. By contrast, processing a block of audio that includes voice audio in a voice command system can include a significant amount of processing (e.g., more than processing silence) and therefore be completed in a second (e.g., more than the first) amount of time. In either situation, processing the block of audio should be completed in less than a threshold (e.g., based on a maximum response time) amount of time. Examples including processing source data 5 including video and audio have been described. However, other source data 5 types are within the scope of this disclosure. Examples may include audio (e.g., using one or more microphones), image and/or video (e.g., using one or more cameras) signals, and/or wireless (3G/4G/5G/6G/WiFi/BT/MMW) from radio-frequency (RF) signals antennas and/or sensors.

The neural network selection module 110 can be configured to select a neural network to perform a task(s) associated with the source data 5. For example, the neural network selection module 110 can be configured to select the neural network to perform the task(s) based on the analyzed source data 5. In an example implementation, the data analysis module 105 can be configured to generate a feature(s) associated with the source data 5. The neural network selection module 110 can be configured to select a neural network to perform a task(s) associated with the source data 5 based on the features. For example, the features can indicate (or be used to indicate) complexity (e.g., processing requirements) associated with the source data 5. For example, the features can indicate (or be used to indicate) how long two or more neural networks may take to perform a task. The neural network selection module 110 can be configured to select one of the two or more neural networks based on the complexity (e.g., the neural network should be capable of performing the task) and based on whether the neural network can perform the task within a time threshold or constraint.

The recurrent neural network datastore 115 can be configured to store a plurality or recurrent neural networks each configured to perform a task(s). The non-recurrent neural network datastore 120 can be configured to store a plurality or non-recurrent neural networks each configured to perform a task(s). A recurrent network (RNN) can be configured to use a feed-back loop (e.g., the output of the neural network is fed back to the input of the neural network). By contrast, non-recurrent network can be a feed-forward neural network or a neural network without a feed-back loop. A non-recurrent network can be, for example, a convolutional neural network (CNN).

The neural network execution module 125 can be configured to execute a selected neural network. In an example implementation, the neural network execution module 125 can store two or more recurrent neural networks and/or two or more non-recurrent neural network. In an example implementation, the neural network execution module 125 can be configured to select a recurrent neural from the recurrent neural network datastore 115 and/or a recurrent neural from the non-recurrent neural network datastore 120. In an example implementation, the neural network execution module 125 can be two or more modules configured to execute on a same processor or a different processor. For example, the neural network execution module 125 can be in a split-compute configuration. In the split compute configuration, a first neural network execution module 125 can be configured to operate on a local device and a second neural network execution module 125 can be configured to operate on a remote device. For example, the remote device can be a companion device (e.g., a mobile phone) communicatively coupled to a wearable device (e.g., smart glasses). For example, the remote device can be a networked device communicatively coupled to the local device via an Internet and/or Intranet.

Figure 2:
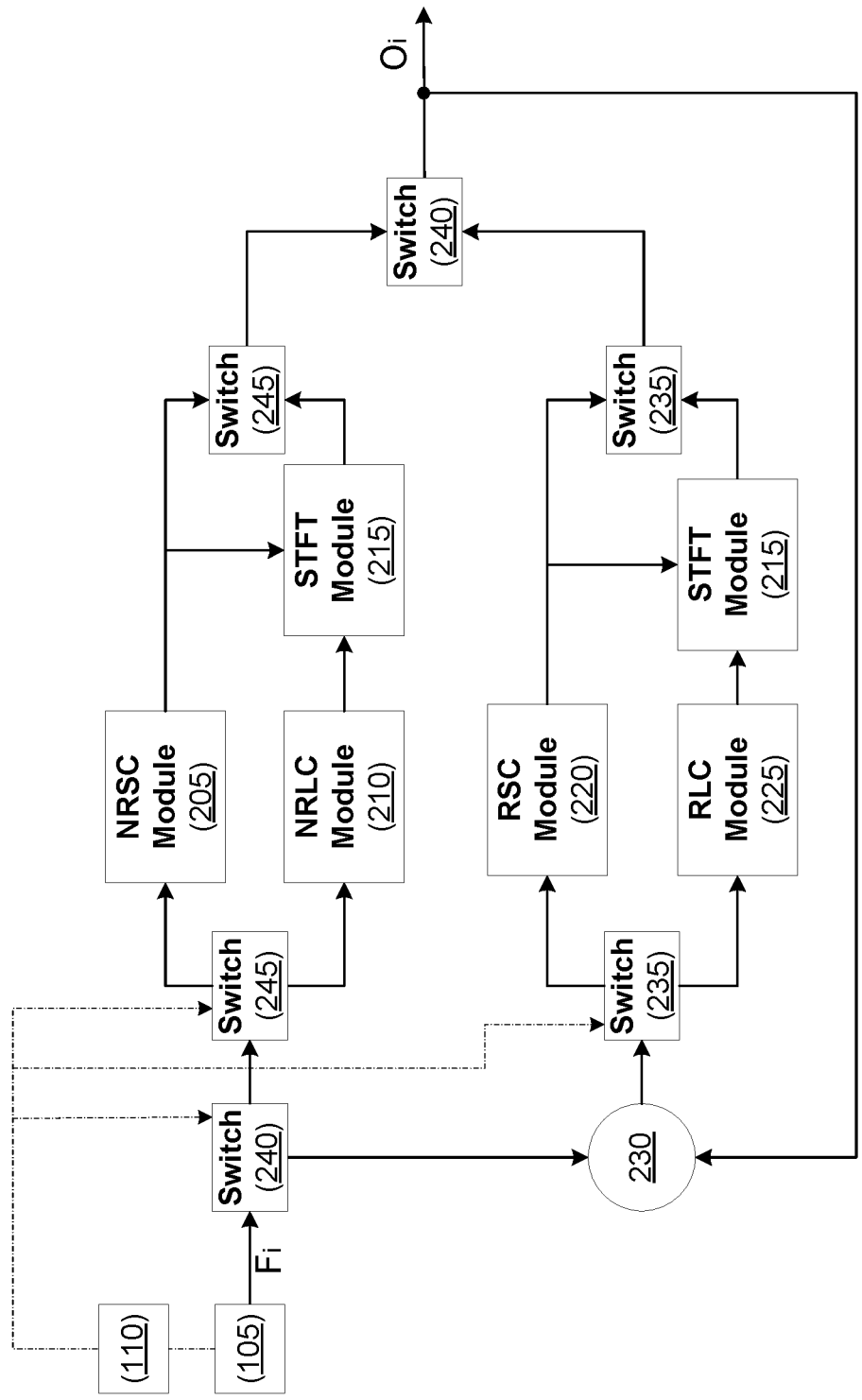
FIG. 2 illustrates a block diagram of a data flow within a distributed and/or heterogeneous computation architecture according to an example implementation.

FIG. 2 illustrates a block diagram of a data flow within a distributed and/or heterogeneous computation architecture according to an example implementation. The data flow can be, for example, within the architecture of the neural network execution module 125 and/or any combination of the elements of FIG. 1. As shown in FIG. 2, the data flow can include a non-recurrent short computation (NRSC) module 205 block, a non-recurrent long computation (NRLC) module 210 block, a recurrent short computation (RSC) module 220 block, a recurrent long computation (RLC) module 225 block, a spatiotemporal feature transitivity (STFT) module 215 block(s), and an arithmetic operation 230 block. The dataflow has as input features Fi and can generate an output Oi. The features can be generated by the data analysis module 105 based on the source data 5. The output Oi can be a predicted output (e.g., an output predicted by a neural network). The dataflow can include three switches 235, 240, 245. The switches 235, 240, 245 can be a selection operation (e.g., multiplexor (MUX)) and/or a fusion operation (e.g., a mixer (MIX)) and/or a combination thereof.

The NRSC module 205 can be a neural network. The neural network can be a non-recurrent neural network (e.g., selected from the non-recurrent neural network datastore 120). The NRLC module 210 can be a neural network. The neural network can be a non-recurrent neural network (e.g., selected from the non-recurrent neural network datastore 120). The NRSC module 205 can be a non-recurrent neural network with a short computation (e.g., a latency that is shorter than a real time (RT) constraint or threshold). The NRLC module 210 can be a non-recurrent neural network with a long computation (e.g., a latency that is longer than a real time (RT) constraint or threshold). The NRSC module 205 can be a non-recurrent neural network with a shorter computation time than the NRLC module 210 non-recurrent neural network.

The RSC module 220 can be a neural network. The neural network can be a recurrent neural network (e.g., selected from the recurrent neural network datastore 115). The RLC module 225 can be a neural network. The neural network can be a recurrent neural network (e.g., selected from the recurrent neural network datastore 115). The RSC module 220 can be a neural network with a short computation (e.g., a latency that is shorter than a real time (RT) constraint or threshold). The RLC module 225 can be a neural network with a long computation (e.g., a latency that is longer than a real time (RT) constraint or threshold).

The arithmetic operation 230 can be an arithmetic operation that combines (e.g., concatenation) a current input Fi with a previous output Oi when the output Oi was generated by the RSC module 220 and/or the RLC module 225. The arithmetic operation 230 can form the feedback loop associated with a recurrent neural network. The arithmetic operation 230 can be a design choice.

The STFT module 215 can be configured to align the output of the RLC module 225 or the output of the NRLC module 210 with the output of a task in a sequence of tasks. For example, referring to FIG. 3E, a RLC module 225 processes over three RSC modules 220. In the example of FIG. 3E, task processing branches after the second RSC module 220, task processing continues in the RLC module 225, and then processing continues with the sixth RSC module 220 using the output of the RLC module 225. The branch out at the second RSC module 220 and branch back in the sixth RSC module 220 may cause a time and/or spatial data (e.g., output Oi) mismatch. Therefore, a STFT module 215 can be inserted after the RLC module 225 to shift an output the RLC module 225 in time and/or spatially in order to time and/or spatial align the output of the RLC module 225 with the input of the sixth RSC module 220 as if the output Oi of the fifth RSC module 220 were the input of sixth RSC module 220.

The STFT module 215 can have three inputs Fs, Ft, and Os. In some implementations, the RLC module 225 (or NRLC Module 210) provides Os and Fs. In some implementations, the RLC module 225 (or NRLC Module 210) can provide Ft. In some implementations, the RSC module 220 (or NRSC Module 205) can provide Ft. In some implementations, Ft may be obtained from a memory location, e.g., by the RSC Module 220, the RLC Module 225, or the STFT Module 215. The STFT module 215 can have one output Ot. Fs can be defined as $F(\tau_i, \sigma_m)$, Ft can be defined as $F(\tau_j, \sigma_n)$, Os can be defined as $O(\tau_i, \sigma_m)$, and Ot can be defined as $O(\tau_j, \sigma_n)$ where $\tau$ can be temporal data and $\sigma$ can be spatial data (index i, m, j, and n indicate that the data is processed as blocks of data (e.g., a video frame)). Ot can equal $\mathcal{T}$(Fs, Ft, Os), where function $\mathcal{T}$( ) is the STFT. Function F( ) can be a feature function that maps a spatiotemporal index pair to an associated feature and function O( ) can be a prediction output function that maps a spatiotemporal index pair to an associated prediction output. Fs and Ft can be the source and target spatiotemporal features and Os and Ot can be the source and target prediction outputs. Data (e.g., input data) associated with index j, and n can be later in time than data (e.g., output data) associated with i and m. Some implementations may not include a spatial element. In an example optical flow task, Fs and Ft can be the source and target input images, respectively, associated with specific (temporal) frame indices and (spatial) region indices in the images. Os and Ot can be the predicted optical flow outputs associated with the source and target spatiotemporal features, respectively.

As shown in FIG. 2, switches 235, 240, 245 can be controlled by the neural network selection module 110. Switches 235, 240, 245 can be configured to control which of the NRSC module 205, the NRLC module 210, the RSC module 220, and/or the RLC module 225 is to perform the task (e.g., process a corresponding neural network) and/or to control which output of the NRSC module 205, the NRLC module 210, the RSC module 220, and/or the RLC module 225 is to be used. In other words, switches 235, 240, 245 can control the input to the NRSC module 205, the NRLC module 210, the RSC module 220, and/or the RLC module 225. Further, switches 235, 240, 245 can control the output of the NRSC module 205, the NRLC module 210, the RSC module 220, and/or the RLC module 225. In other words, switches 235, 240, 245 can control whether or not the output of the NRSC module 205, the NRLC module 210, the RSC module 220, and/or the RLC module 225 is used as the product of a task. In some implementations, multiple switches 235, 240, and/or 245 can be used and operate (or coordinate) together for a desired function.

As mentioned above, a neural network can be associated with and stored in a memory of each of the NRSC module 205, the NRLC module 210, the RSC module 220, and/or the RLC module 225. Alternatively (and/or in addition), a neural network can be read from a datastore (e.g., a memory) separate from (or remote to) each of the NRSC module 205, the NRLC module 210, the RSC module 220, and/or the RLC module 225.

The switch(es) 240 can be used to select one of a recurrent neural network or a non-recurrent neural network. In an example implementation, a task to be performed can be fixed as recurrent neural network or a non-recurrent neural network. In other words, only a recurrent neural network computation is performed or only a non-recurrent neural network computation is performed. Which of a recurrent neural network computation or a non-recurrent neural network computation is performed can be a design choice. For example, a non-recurrent neural network can be used in a task that processes an image, whereas a recurrent neural network can be used in a task that processes a video or text. In an example implementation, the switch 240 can be controlled by the neural network selection module 110 (e.g., selected for each data block to be processed). Alternatively, the switch 240 can be positioned at design time and left in the position substantially permanently.

In an example implementation, switches 235 and 245 can be controlled by the neural network selection module 110 based on whether a long computation is to be performed or a short computation is to be performed or output is used. In an example Implementation, the neural network selection module 110 can select the short computation (e.g., NRSC module 205, the RSC module 220) by default. Selecting the long computation or the short computation should cause the completion of task(s) within a time criteria or threshold. The neural network selection module 110 can be implemented using a neural network. Therefore, selecting switches 235 or switch 245 can be based on a prediction of which computation (e.g., long or short) is to be performed. The prediction can include a confidence metric. For example, in order to switch from the short computation (e.g., NRSC module 205, the RSC module 220) to the long computation (e.g., the NRLC module 210, the RLC module 225) the prediction should be above a threshold (e.g., a confidence of 85%) confidence that the prediction of the long computation (e.g., the NRLC module 210, the RLC module 225) is correct.

In an example implementation only one of the short computation (e.g., NRSC module 205, the RSC module 220) or the long computation (e.g., the NRLC module 210, the RLC module 225) is processed. In an example implementation both of the short computation (e.g., NRSC module 205, the RSC module 220) and the long computation (e.g., the NRLC module 210, the RLC module 225) are processed. In this implementation, one of the short computation (e.g., NRSC module 205, the RSC module 220) or the long computation (e.g., the NRLC module 210, the RLC module 225) is selected (e.g., a MUX operation) or both of the short computation (e.g., NRSC module 205, the RSC module 220) and the long computation (e.g., the NRLC module 210, the RLC module 225) is selected (e.g., a MIX operation). In some implementations the output of NRSC module 205 and/or RSC module 220 can be used as input (e.g., Ot, Ft) to the STFT module 215.

FIGS. 3A-3D illustrate block diagrams of a sequence of computer implemented tasks according to an example implementation. The sequence of computer implemented tasks shown in FIGS. 3A-3D each can be associated with a non-real-time system. In an example implementation, the non-real-time system can be a static distributed and/or heterogeneous task computation system that may be considered as a special case of a dynamic distributed or heterogeneous task computation system without link prediction and/or transitivity.

Figure 3A:
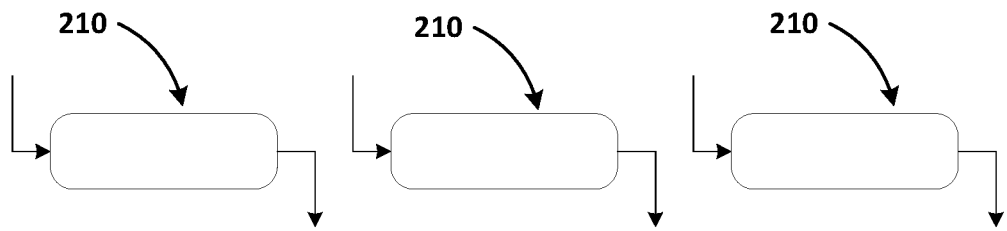
FIG. 3A illustrates a block diagram of a sequence of computer implemented tasks according to an example implementation.

The sequence of computer implemented tasks shown in FIG. 3A can be non-real-time and non-recurrent (e.g., the input is independent of the output). As shown in FIG. 3A, the sequence of computer implemented tasks includes three (3) NRLC modules 210 each having an input that is not connected to the output of an adjacent (e.g., earlier in time) NRLC module 210. Although not shown, the input to each NRLC module 210 can be a block of data of a stream of data (e.g., a frame of a video, images, audio data, sensed data, and the like). The input to each NRLC module 210 can be sequential (e.g., in time) blocks of data of a stream of data. The NRLC module 210 can be configured to complete a task associated with processing an associated block of data. The tasks described above are implemented using a neural network (e.g., a CNN). However, example implementations can implement a task using other computer processes. For example, a task can be a computer implemented algorithm, a computer implemented arithmetic operation, a computer function (e.g., processor executed lines of computer code), and the like. For example, tasks associated with compressing an image can include prediction (e.g., an inter-prediction), a transform, a quantization, entropy encoding, and the like. The tasks associated with compressing the image can be a computer implemented algorithm. However, tasks associated with compressing an image can also include neural networks (e.g., a UNET) including a plurality of layers (e.g., convolutions, filters pooling, and the like) where each layer can be included in the task and/or each layer can be a task.

Figure 3B:
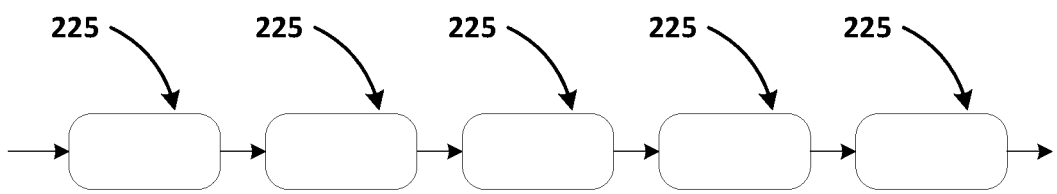
FIG. 3B illustrates a block diagram of a sequence of computer implemented tasks according to an example implementation.

The sequence of computer implemented tasks shown in FIG. 3B can be non-real-time and recurrent (e.g., the input is dependent on an output). As shown in FIG. 3B, the sequence of computer implemented tasks includes a plurality of RLC modules 225 each having an input that is connected to the output of an adjacent (e.g., earlier in time) RLC modules 225. Therefore, the sequence of computer implemented tasks shown in FIG. 3B can be a sequence of homo-latency tasks (e.g., processing of each task each take substantially the same amount of time). Although not shown, the input to each RLC module 225 can also include a block of data of a stream of data (e.g., a frame of a video, images, audio data, sensed data, and the like). The input to each RLC module 225 can be sequential (e.g., in time) blocks of data of a stream of data. The RLC modules 225 can be configured to complete a task associated with processing an associated block of data. The tasks described above are implemented using a neural network (e.g., an RNN). However, example implementations can implement a task using other computer processes. For example, a task can be a computer implemented algorithm, a computer implemented arithmetic operation, a computer function (e.g., processor executed lines of computer code), and the like. For example, tasks associated with compressing a frame of video can include prediction (e.g., an intra-prediction and an inter-prediction), a transform, a quantization, entropy encoding, and the like. The tasks associated with compressing the frame can be a computer implemented algorithm. However, tasks associated with compressing the frame can also include neural networks (e.g., an RNN) including a plurality of layers (e.g., including processing nodes) where each layer can be included in the task and/or each layer can be a task.

Figure 3C:
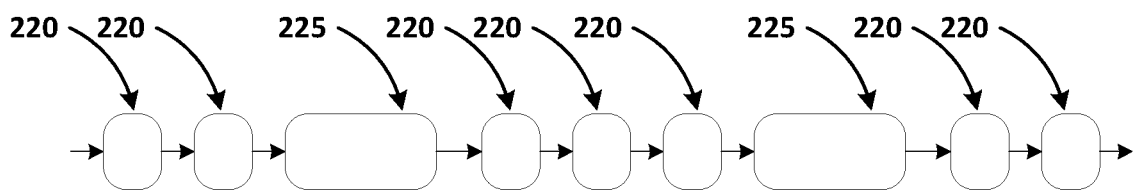
FIG. 3C illustrates a block diagram of a sequence of computer implemented tasks according to an example implementation.

The sequence of computer implemented tasks shown in FIG. 3C can be non-real-time and recurrent (e.g., the input is dependent on an output). As shown in FIG. 3C, the sequence of computer implemented tasks includes a plurality of RSC modules 220 and a plurality of RLC modules 225 each having an input that is connected to the output of an adjacent (e.g., earlier in time) RSC module 220 or RLC module 225. Therefore, the sequence of computer implemented tasks shown in FIG. 3C can be a sequence of hetero-latency tasks (e.g., processing of each task may not take the same amount of time). Although not shown, the input to each RSC module 220 and RLC module 225 can also include a block of data of a stream of data (e.g., a frame of a video, images, audio data, sensed data, and the like). The input to each RSC module 220 and RLC module 225 can be sequential (e.g., in time) blocks of data of a stream of data. The RSC modules 220 and the RLC modules 225 can be configured to complete a task associated with processing an associated block of data. The tasks described above are implemented using a neural network (e.g., an RNN). However, as described with regard to FIG. 3B, example implementations can implement a task using other computer processes.

Figure 3D:
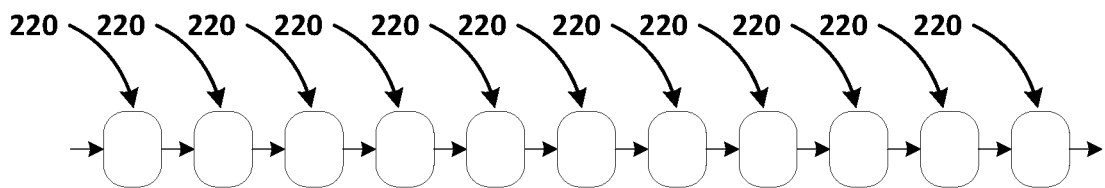
FIG. 3D illustrates a block diagram of a sequence of computer implemented tasks according to an example implementation.
Figure 3E:
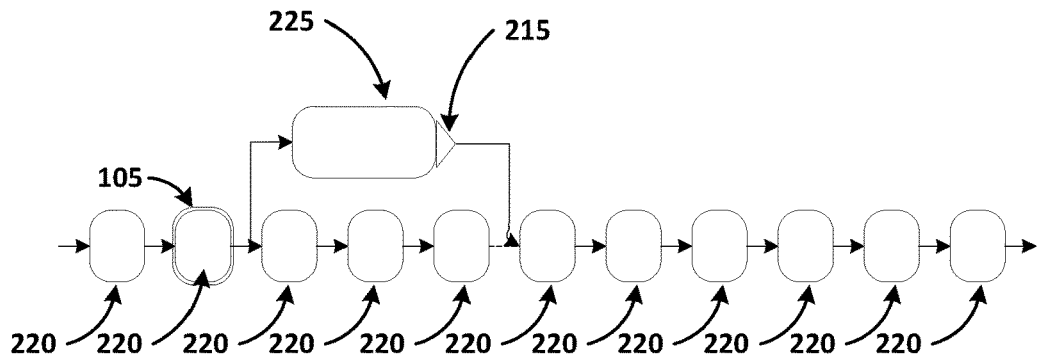
FIG. 3E illustrates a block diagram of a sequence of computer implemented tasks according to an example implementation.

The sequence of computer implemented tasks shown in FIG. 3D can be real-time or non-real-time and recurrent (e.g., the input is dependent on an output). As shown in FIG. 3D, the sequence of computer implemented tasks includes a plurality of RSC modules 220 each having an input that is connected to the output of an adjacent (e.g., earlier in time) RSC module 220. Therefore, the sequence of computer implemented tasks shown in FIG. 3C can be a sequence of homo-latency tasks (e.g., processing of each task may not take the same amount of time). An RSC module 220 can implement a non-recurrent task with a short computation (e.g., a latency that is shorter than a real time (RT) constraint or threshold). Therefore, the sequence of computer implemented tasks shown in FIG. 3D can be computed in real-time and any real-time sequence of computer implemented tasks can also function as a non-real-time sequency. Although not shown, the input to each RSC module 220 can also include a block of data of a stream of data (e.g., a frame of a video, images, audio data, sensed data, and the like). The input to each RSC module 220 can be sequential (e.g., in time) blocks of data of a stream of data. The RSC modules 220 can be configured to complete a task associated with processing an associated block of data. The tasks described above are implemented using a neural network (e.g., an RNN). However, as described with regard to FIG. 3B, example implementations can implement a task using other computer processes.

Figure 3F:
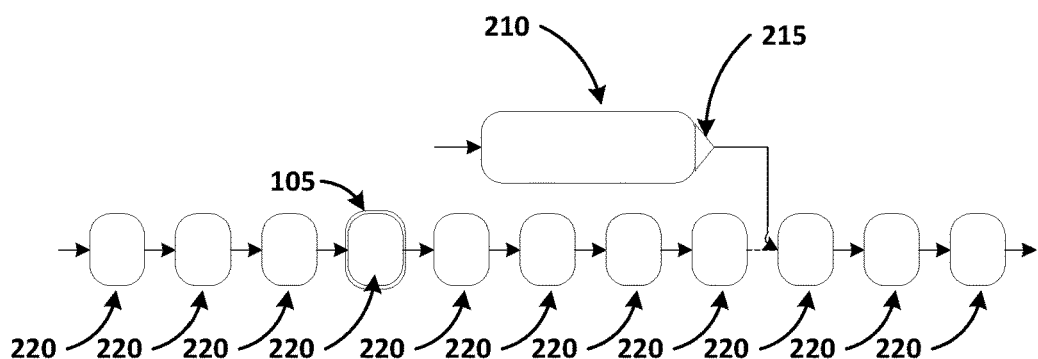
FIG. 3F illustrates a block diagram of a sequence of computer implemented tasks according to an example implementation.
Figure 3G:
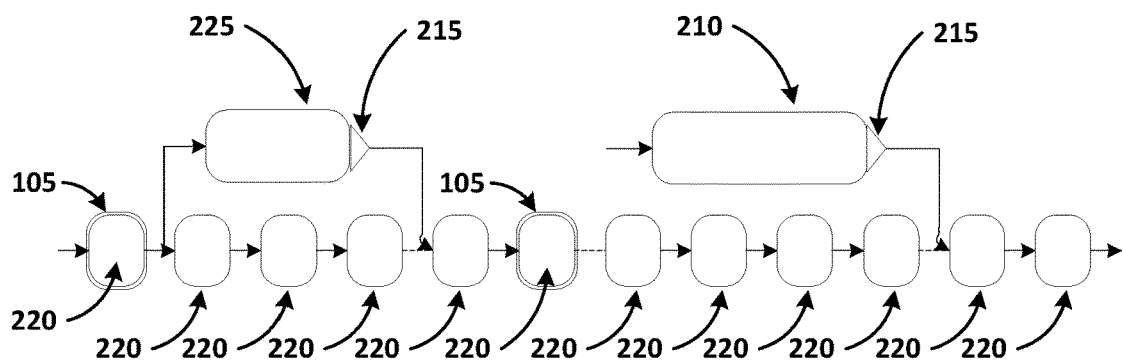
FIG. 3G illustrates a block diagram of a sequence of computer implemented tasks according to an example implementation.

FIGS. 3E-3G illustrate a block diagram of a sequence of computer implemented tasks according to an example implementation. The sequence of computer implemented tasks shown in FIGS. 3E-3G each can be associated with a real-time system. In an example implementation, the real-time system can be a dynamic distributed and/or heterogeneous task computation system. In the Example implementations of FIG. 3E, the dashed lines indicate the connection may or may not exist. For example, in a MUX implementation, the connection may not exist. By contrast, in a MIX implementation, the connection may exist.

In an example implementation, each task can be a machine learned task. The sequence of tasks can be a distributed sequence of machine learned tasks. In addition, the distributed sequence of machine learned tasks is trained on two or more computing devices. In an example implementation, each task can be implemented as a neural network. The sequence of tasks can be a distributed sequence of neural networks. In addition, the distributed sequence of neural networks can be trained on two or more computing devices. For example, referring to FIGS. 3E-3G, each NRLC module 210, RSC module 220, and the RLC module 225 can be machine learned tasks and/or neural networks. Each NRLC module 210, RSC module 220, and the RLC module 225 can predict and/or infer an output. Each NRLC module 210, RSC module 220, and the RLC module 225 can be implemented as distributed machine learned tasks and/or neural networks. In other words, each NRLC module 210, RSC module 220, and the RLC module 225 can be implemented (e.g., executed using a memory and a processor) on two or more computing devices. For example, each NRLC module 210, RSC module 220, and the RLC module 225 can be implemented on a local device (e.g., smart glasses), a companion device (e.g., a mobile phone), and/or a remote device (e.g., a server). Accordingly, training the machine learned tasks and/or neural networks can be performed on two or more computing devices.

For example, referring to FIG. 3E, the RSC modules 220 can be implemented on a local device, and the RLC module 225 together with the STFT module 215 can be implemented on a companion device and/or a remote device. For example, when operating the sequence of tasks in FIG. 3E, the RSC modules 220 can be implemented on a smart glasses and the RLC module 225 together with the STFT module 215 can be implemented on a mobile phone and/or a server. Accordingly, training the RSC modules 220 and the RLC module 225 together with the STFT module 215 can include using a distributed machine learning training or learning technique including training using training data on a local device (e.g., smart glasses), a companion device (e.g., a mobile phone), and/or a remote device (e.g., a server).

The sequence of computer implemented tasks shown in FIG. 3E can be real-time and recurrent (e.g., the input is dependent on an output). As shown in FIG. 3E, the sequence of computer implemented tasks includes a plurality of RSC modules 220 and an RLC module 225 each having an input that is connected to the output of an adjacent (e.g., earlier in time) RSC module 220 or RLC module 225. Therefore, the sequence of computer implemented tasks shown in FIG. 3E can be a sequence of hetero-latency tasks (e.g., processing of each task may not take the same amount of time). Although not shown, the input to each RSC module 220 and the RLC module 225 can also include a block of data of a stream of data (e.g., a frame of a video, images, audio data, sensed data, and the like). The input to each RSC module 220 and the RLC module 225 can be sequential (e.g., in time) blocks of data of a stream of data. The RSC modules 220 and the RLC module 225 can be configured to complete a task associated with processing an associated block of data.

In the example of FIG. 3E, task processing branches after the second RSC module 220, task processing continues in the RLC module 225, and then processing continues with the sixth RSC module 220 using the output of the RLC module 225. The branch out at the second RSC module 220 can be in response to operation of the data analysis module 105 and the neural network selection module 110 (shown only as the data analysis module 105 for clarity). The branch out at the second RSC module 220 and branch back in the sixth RSC module 220 may cause a time and/or spatial data (e.g., output Oi) mismatch. Therefore, a STFT module 215 can be inserted after the RLC module 225 to shift an output the RLC module 225 in time and/or spatially in order to time and/or spatial align the output of the RLC module 225 with the input of the sixth RSC module 220 as if the output Oi of the fifth RSC module 220 were the input of sixth RSC module 220. In an example implementation, the output Oi of the fifth RSC module 220 can be combined (e.g., averaged) with the STFT aligned output of the RLC module 225 as the input to the sixth RSC module 220. The RLC module 225 performs a task within a time associated with three (3) RSC modules 220. Therefore, the sequence of computer implemented tasks shown in FIG. 3E can be completed in substantially the same amount of time (e.g., a time constraint) whether or not the task processing branches after the second RSC module 220. The tasks described above are implemented using a neural network (e.g., an RNN). However, as described with regard to FIG. 3B, example implementations can implement a task using other computer processes.

The sequence of computer implemented tasks shown in FIG. 3F can be real-time and recurrent (e.g., the input is dependent on an output). As shown in FIG. 3F, the sequence of computer implemented tasks includes a plurality of RSC modules 220 each having an input that is connected to the output of an adjacent (e.g., earlier in time) RSC module 220. The sequence of computer implemented tasks also includes an NRLC module 210. Therefore, the sequence of computer implemented tasks shown in FIG. 3F can be a sequence of hetero-latency tasks (e.g., processing of each task may not take the same amount of time) and hetero-recurrency (e.g., includes both non-recurrent and recurrent tasks). Although not shown, the input to each RSC module 220 and the NRLC module 210 can also include a block of data of a stream of data (e.g., a frame of a video, images, audio data, sensed data, and the like). The input to each RSC module 220 and the NRLC module 210 can be sequential (e.g., in time) blocks of data of a stream of data. The RSC modules 220 and the NRLC module 210 can be configured to complete a task associated with processing an associated block of data.

In the example of FIG. 3F, task processing branches after the fourth RSC module 220, task processing continues in the NRLC module 210 (without the output of the fourth RSC module 220), and then processing continues with the ninth RSC module 220 using the output of the NRLC module 210. The branch out at the fourth RSC module 220 can be in response to operation of the data analysis module 105 and the neural network selection module 110 (shown only as the data analysis module 105 for clarity). The branch out at the fourth RSC module 220 and branch back in the ninth RSC module 220 may cause a time and/or spatial data (e.g., output Oi) mismatch. Therefore, a STFT module 215 can be inserted after the NRLC module 210 to shift an output the NRLC module 210 in time and/or spatially in order to time and/or spatial align the output of the NRLC module 210 with the input of the ninth RSC module 220 as if the output Oi of the eighth RSC module 220 were the input of ninth RSC module 220. In an example implementation, the output Oi of the eighth RSC module 220 can be combined (e.g., averaged) with the STFT aligned output of the NRLC module 210 as the input to the ninth RSC module 220. The NRLC module 210 performs a task within a time associated with four (4) RSC modules 220. Therefore, the sequence of computer implemented tasks shown in FIG. 3F can be completed in substantially the same amount of time (e.g., a time constraint) whether or not the task processing branches after the fourth RSC module 220. The tasks described above are implemented using a neural network (e.g., an RNN). However, as described with regard to FIG. 3B, example implementations can implement a task using other computer processes.

The sequence of computer implemented tasks shown in FIG. 3G can be real-time and recurrent (e.g., the input is dependent on an output). As shown in FIG. 3G, the sequence of computer implemented tasks includes a plurality of RSC modules 220 and an RLC module 225 each having an input that is connected to the output of an adjacent (e.g., earlier in time) RSC module 220 or RLC module 225. The sequence of computer implemented tasks also includes an NRLC module 210. Therefore, the sequence of computer implemented tasks shown in FIG. 3E can be a sequence of hetero-latency tasks (e.g., processing of each task may not take the same amount of time), hetero-recurrency (e.g., includes both non-recurrent and recurrent tasks), and hetero-transitivity (e.g., includes both non-recurrent and recurrent tasks with non-recurrent and recurrent task branches). Although not shown, the input to each RSC module 220, the RLC module 225, and the NRLC module 210 can also include a block of data of a stream of data (e.g., a frame of a video, images, audio data, sensed data, and the like). The input to each RSC module 220, the RLC module 225, and the NRLC module 210 can be sequential (e.g., in time) blocks of data of a stream of data. The RSC modules 220 and the RLC module 225 can be configured to complete a task associated with processing an associated block of data.

In the example of FIG. 3G, task processing branches after the first RSC module 220, task processing continues in the RLC module 225, and then processing continues with the fifth RSC module 220 using the output of the RLC module 225. The branch out at the first RSC module 220 can be in response to operation of the data analysis module 105 and the neural network selection module 110 (shown only as the data analysis module 105 for clarity). The branch out at the first RSC module 220 and branch back in the fifth RSC module 220 may cause a time and/or spatial data (e.g., output Oi) mismatch. Therefore, a STFT module 215 can be inserted after the RLC module 225 to shift an output the RLC module 225 in time and/or spatially in order to time and/or spatial align the output of the RLC module 225 with the input of the fifth RSC module 220 as if the output Oi of the fourth RSC module 220 were the input of the sixth RSC module 220. In an example implementation, the output Oi of the fourth RSC module 220 can be combined (e.g., averaged) with the STFT aligned output of the RLC module 225 as the input to the fifth RSC module 220. The RLC module 225 performs a task within a time associated with three (3) RSC modules 220. Therefore, the sequence of computer implemented tasks shown in FIG. 3G can be completed in substantially the same amount of time (e.g., a time constraint) whether or not the task processing branches after the first RSC module 220.

In the example of FIG. 3G, task processing branches after the sixth RSC module 220, task processing continues in the NRLC module 210 (without the output of the sixth RSC module 220), and then processing continues with the eleventh RSC module 220 using the output of the NRLC module 210. The branch out at the sixth RSC module 220 can be in response to operation of the data analysis module 105 and the neural network selection module 110 (shown only as the data analysis module 105 for clarity). The branch out at the sixth RSC module 220 and branch back in the eleventh RSC module 220 may cause a time and/or spatial data (e.g., output Oi) mismatch. Therefore, a STFT module 215 can be inserted after the NRLC module 210 to shift an output the NRLC module 210 in time and/or spatially in order to time and/or spatial align the output of the NRLC module 210 with the input of the eleventh RSC module 220 as if the output Oi of the tenth RSC module 220 were the input of eleventh RSC module 220. In an example implementation, the output Oi of the tenth RSC module 220 can be combined (e.g., averaged) with the STFT aligned output of the NRLC module 210 as the input to the eleventh RSC module 220. The NRLC module 210 performs a task within a time associated with four (4) RSC modules 220. Therefore, the sequence of computer implemented tasks shown in FIG. 3G can be completed in substantially the same amount of time (e.g., a time constraint) whether or not the task processing branches after the sixth RSC module 220. The tasks described above are implemented using a neural network (e.g., an RNN). However, as described with regard to FIG. 3B, example implementations can implement a task using other computer processes.

Figure 4:
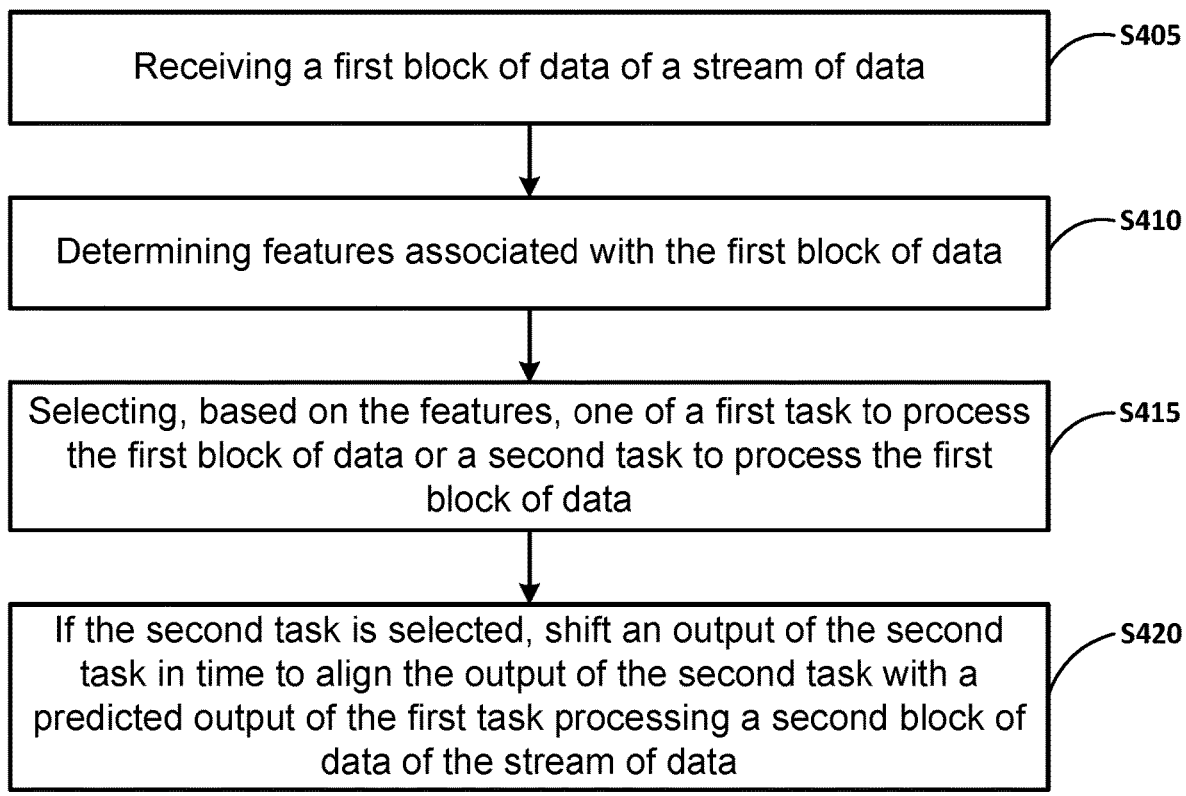
FIG. 4 illustrates a block diagram of a method of processing a stream of data in a sequence of tasks according to an example implementation.

FIG. 4 illustrates a block diagram of a method of processing a stream of data in a sequence of tasks according to an example implementation. As shown in FIG. 4, in step S405 a first block of data of a stream of data is received. The stream of data can be, for example, a video, images, audio data, sensed data, and the like. The first block of data of the stream of data can be a portion of the received stream of data. For example, the first block of data can be a frame of a video, an image of a plurality of imaged being captured by a camera, a windowed block of audio data, a windowed block of sensed data (e.g., motion data, location data, and the like).

In step S410 features associated with the first block of data are determined. For example, a feature map can be generated based on the first block of data. If the first block of data is a frame of a video or an image, a feature map can have a same structure as the frame or image. However, instead of pixels a feature map has a value based on at least one feature (e.g., color, frequency domain, edge detectors, and/or the like). The feature map can be generated using a neural network. For example, the neural network can include a convolution layer(s) or convolution configured to extract features from the frame or image. Features can be based on color, frequency domain, edge detectors, and/or the like. A convolution can have a filter (sometimes called a kernel) and a stride. For example, a filter can be a 1×1 filter (or 1×1×n for a transformation to n output channels, a 1×1 filter is sometimes called a pointwise convolution) with a stride of 1 which results in an output of a cell generated based on a combination (e.g., addition, subtraction, multiplication, and/or the like) of the features of the cells of each channel at a position of the M×M grid. In other words, a feature map having more than one depth or channels is combined into a feature map having a single depth or channel.

In step S415 one of a first task to process the first block of data or a second task to process the first block of data is selected based on the features to process the first block of data. For example, the features can indicate a complexity for processing the first block of data. The time to process the first block of data can be based on processing complexity. The first task may be configured to complete processing within a first amount of time if the complexity of the data input to the task is below a predetermined complexity. The second task may be configured to complete processing within a second amount of time if the complexity of the data input to the task is below a predetermined complexity. The first amount of time (e.g., a short computation time) may be less than the second amount of time (e.g., a long computation time). Therefore, if the features indicate the complexity for processing the first block of data is within a complexity level that processing the task can be completed within the first amount of time, the first task may be selected. Otherwise, the second task may be selected.

In an example implementation, step S415 can include determining, prior to the selecting, whether a first task and a second task are configured to process the first block of data. For example, the sequence of tasks can include an indication that more than one task can be configured to process a block of data. In an example implementation, the tasks of the more than one task can be executed on a same computing device or different computing devices.

In step S420 if the second task is selected, an output of the second task is shifted in time to align the output of the second task with a predicted output of the first task processing a second block of data of the stream of data. For example, the output of the second task can be processed through a spatiotemporal feature transitivity (STFT) function. The STFT function can have three inputs and the second task can have three outputs. In addition, the STFT function can have one output. Therefore, the second task can generate source and target spatiotemporal features and a source prediction output. the STFT function can generate (e.g., predict) an output based on the source and target spatiotemporal features and the source prediction.

Figure 5:
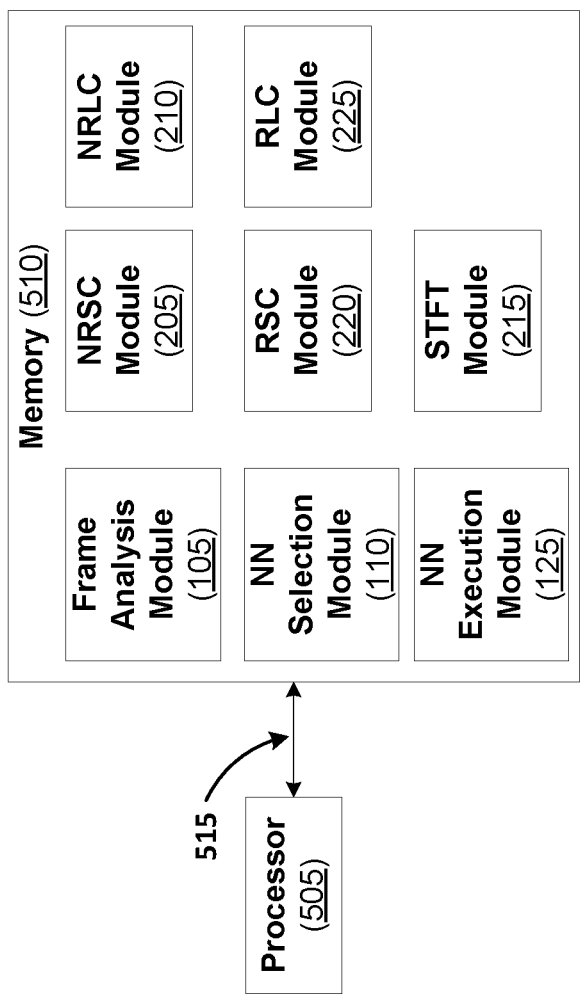
FIG. 5 illustrates a block diagram of a system according to an example implementation.

FIG. 5 illustrates a block diagram of a system according to an example implementation. In the example of FIG. 5, the system (e.g., an augmented reality system, a virtual reality system, and/or any system configured to process a task (e.g., compress audio, video, images, convert text-to-voice, translate text, and the like) can include a computing system or at least one computing device and should be understood to represent virtually any computing device configured to perform the techniques described herein. As such, the device may be understood to include various components which may be utilized to implement the techniques described herein, or different or future versions thereof. By way of example, the system can include a processor 505 and a memory 510 (e.g., a non-transitory computer readable memory). The processor 505 and the memory 510 can be coupled (e.g., communicatively coupled) by a bus 515.

The processor 505 may be utilized to execute instructions stored on the at least one memory 510. Therefore, the processor 505 can implement the various features and functions described herein, or additional or alternative features and functions. The processor 505 and the at least one memory 510 may be utilized for various other purposes. For example, the at least one memory 510 may represent an example of various types of memory and related hardware and software which may be used to implement any one of the modules described herein.

The at least one memory 510 may be configured to store data and/or information associated with the device. The at least one memory 510 may be a shared resource. Therefore, the at least one memory 510 may be configured to store data and/or information associated with other elements (e.g., image/video processing or wired/wireless communication) within the larger system. Together, the processor 505 and the at least one memory 510 may be utilized to implement the techniques described herein. As such, the techniques described herein can be implemented as code segments (e.g., software) stored on the memory 510 and executed by the processor 505. Accordingly, the memory 510 can include the data analysis module 105, the neural network selection module 110, the neural network execution module 125, the NRSC module 205, the NRLC module 210, the RSC module 220, the RLC module 225, and the STFT module 215 each described in detail above.

In an example implementation, the processor 505 and/or the at least one memory 510 may be implemented on more than one computing device. For example, a local computing device (e.g., a wearable device) can include a processor and memory representing the processor 505 and/or the at least one memory 510, a companion computing device (e.g., a mobile phone) can include a processor and memory representing the processor 505 and/or the at least one memory 510, a cloud computing device (e.g., a server) can include a processor and memory representing the processor 505 and/or the at least one memory 510, and/or the like. For example, in an example implementation, the local computing device can include a processor and/or memory used to implement the RSC module 220 and the companion computing device and/or the cloud computing device can include a processor and/or memory used to implement the RLC module 225 and the STFT module 215.

Implementations can include one or more, and/or combinations thereof, of the following examples.

Example 1. A method including processing a stream of data in a sequence of tasks. The processing including receiving a first block of data of the stream of data, determining a first task and a second task are configured to process the first block of data, determining features associated with the first block of data, selecting, based on the features, the second task to process the first block of data, and (in response to selecting the second task) shifting an output of the second task in time to align the output of the second task with a predicted output of the first task processing a second block of data of the stream of data.

Example 2. The method of Example 1, wherein the first task has a first latency, the second task has a second latency, and the second latency is longer then the first latency.

Example 3. The method of Example 2, wherein the first task is processed on a first device, the second task is processed on a second device, and the second latency includes a time associated with communicating the first block of data from the first device to the second device, a time associated with processing the first block of data on the second device, and a time associated with communicating the output of the second task from the second device to the first device.

Example 4. The method of Example 1 the output of the second task is input to a spatiotemporal feature transitivity function, and an output of the spatiotemporal feature transitivity function is the aligned output of the second task.

Example 5. The method of Example 4, wherein the output of the second task includes a source spatiotemporal feature, a target spatiotemporal feature, and a source prediction output.

Example 6. The method of Example 1, wherein the sequence of tasks is associated with a real-time constraint for completing the processing of the sequence of tasks, and the sequence of tasks is completed within the real-time constraint if the first task is selected and if the second task is selected.

Example 7. The method of Example 1, wherein the first task is a recurrent task, and the second task is one of a recurrent task or a non-recurrent task.

Example 8. The method of Example 1, wherein the first task and the second task are machine learned tasks, the sequence of tasks is a distributed sequence of machine learned tasks, and the distributed sequence of machine learned tasks is trained on two or more computing devices.

Example 9. The method of Example 1, wherein the first task and the second task are neural networks, the sequence of tasks is a distributed sequence of neural networks, and the distributed sequence neural network is trained on two or more computing devices.

Example 10. A non-transitory computer-readable storage medium comprising instructions stored thereon that, when executed by at least one processor, are configured to cause a computing system to perform the method of any of Examples 1-9.

Example 11. An apparatus comprising means for performing the method of any of Examples 1-9.

Example 12. An apparatus comprising at least one processor and at least one memory including computer program code, the at least one memory and the computer program code configured to, with the at least one processor, cause the apparatus at least to perform the method of any of Examples 1-9.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within (e.g., stored on) a computer memory (e.g., a non-transitory computer-readable medium). These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    processing a stream of data in a sequence of tasks, the processing including:
        receiving a first block of data of the stream of data;
        determining a first task and a second task are configured to process the first block of data;
        determining features associated with the first block of data;
        selecting, based on the features, the second task to process the first block of data; and
        shifting an output of the second task in time to align the output of the second task with a predicted output of the first task processing a second block of data of the stream of data.

2. The method of claim 1, wherein
    the first task has a first latency,
    the second task has a second latency, and
    the second latency is longer then the first latency.

3. The method of claim 2, wherein
    the first task is processed on a first device,
    the second task is processed on a second device, and
    the second latency includes a time associated with communicating the first block of data from the first device to the second device, a time associated with processing the first block of data on the second device, and a time associated with communicating the output of the second task from the second device to the first device.

4. The method of claim 1, wherein
    the output of the second task is input to a spatiotemporal feature transitivity function, and
    an output of the spatiotemporal feature transitivity function is the aligned output of the second task.

5. The method of claim 4, wherein the output of the second task includes a source spatiotemporal feature, a target spatiotemporal feature, and a source prediction output.

6. The method of claim 1, wherein
    the sequence of tasks is associated with a real-time constraint for completing the processing of the sequence of tasks, and
    the sequence of tasks is completed within the real-time constraint if the first task is selected and if the second task is selected.

7. The method of claim 1, wherein the first task is a recurrent task, and the second task is one of a recurrent task or a non-recurrent task.

8. The method of claim 1, wherein
    the first task and the second task are machine learned tasks,
    the sequence of tasks is a distributed sequence of machine learned tasks, and
    the distributed sequence of machine learned tasks is trained on two or more computing devices.

9. The method of claim 1, wherein
    the first task and the second task are neural networks,
    the sequence of tasks is a distributed sequence of neural networks, and
    the distributed sequence of neural networks is trained on two or more computing devices.

10. A non-transitory computer-readable storage medium comprising instructions stored thereon that, when executed by at least one processor, are configured to cause a computing system to:
    process a stream of data in a sequence of tasks, the processing including:
        receiving a first block of data of the stream of data;
        determining features associated with the first block of data;
        selecting, based on the features, one of a first task to process the first block of data or a second task to process the first block of data; and
        in response to selecting the second task, shift an output of the second task in time to align the output of the second task with a predicted output of the first task processing a second block of data of the stream of data.

11. The non-transitory computer-readable storage medium of claim 10, wherein
the first task has a first latency,
the second task has a second latency, and
the second latency is longer then the first latency.

12. The non-transitory computer-readable storage medium of claim 11, wherein
the first task is processed on a first device,
the second task is processed on a second device, and
the second latency includes a time associated with communicating the first block of data from the first device to the second device, a time associated with processing the first block of data on the second device, and a time associated with communicating the output of the second task from the second device to the first device.

13. The non-transitory computer-readable storage medium of claim 10, wherein
the output of the second task is input to a spatiotemporal feature transitivity function, and
an output of the spatiotemporal feature transitivity function is the aligned output of the second task.

14. The non-transitory computer-readable storage medium of claim 13, wherein the output of the second task includes a source spatiotemporal feature, a target spatiotemporal feature, and a source prediction output.

15. The non-transitory computer-readable storage medium of claim 10, wherein
the sequence of tasks is associated with a real-time constraint for completing the processing of the sequence of tasks, and
the sequence of tasks is completed within the real-time constraint if the first task is selected and if the second task is selected.

16. The non-transitory computer-readable storage medium of claim 10, wherein the first task is a recurrent task, and the second task is one of a recurrent task or a non-recurrent task.

17. The non-transitory computer-readable storage medium of claim 10, wherein
the first task and the second task are machine learned tasks,
the sequence of tasks is a distributed sequence of machine learned tasks, and
the distributed sequence of machine learned tasks is trained on two or more computing devices.

18. The non-transitory computer-readable storage medium of claim 10, wherein
the first task and the second task are neural networks,
the sequence of tasks is a distributed sequence of neural networks, and
the distributed sequence of neural networks is trained on two or more computing devices.

19. An apparatus comprising at least one processor and at least one memory including computer program code, the at least one memory and the computer program code configured to, with the at least one processor, cause the apparatus at least to
process a stream of data in a sequence of neural networks, the processing including:
receiving a first block of data of the stream of data;
determining features associated with the first block of data;
selecting, based on the features, one of a first a neural network to process the first block of data or a second neural network to process the first block of data; and
in response to selecting the second neural network, shift an output of the second neural network in time to align the output of the second neural network with a predicted output of the first neural network processing a second block of data of the stream of data.

20. The apparatus of claim 19, wherein
the output of the second neural network is input to a spatiotemporal feature transitivity function, and
an output of the spatiotemporal feature transitivity function is the aligned output of the second neural network.

* * * * *